United States Patent [19]

Scopatz et al.

[11] Patent Number: 4,595,091

[45] Date of Patent: Jun. 17, 1986

[54] ARTICLE DIVERTER

[75] Inventors: Stephen D. Scopatz; Ian A. Brown, both of Three Rivers, Calif.

[73] Assignee: Pennwalt Corporation, Philadelphia, Pa.

[21] Appl. No.: 606,112

[22] Filed: May 2, 1984

[51] Int. Cl.⁴ .................. B65G 47/34; B65G 47/82; B65G 17/24
[52] U.S. Cl. .................................... 198/372; 198/598
[58] Field of Search ............... 198/372, 448, 598, 739, 198/746, 747, 748, 750, 779; 209/651, 652

[56] References Cited

U.S. PATENT DOCUMENTS

| | | | |
|---|---|---|---|
| 2,115,255 | 4/1938 | David et al. | 198/598 |
| 2,488,230 | 11/1949 | Page | 198/779 |
| 2,726,751 | 12/1955 | Levitt | 198/437 |
| 3,181,684 | 5/1965 | Miller | 198/598 |
| 3,246,733 | 4/1966 | Torbet et al. | 198/372 |
| 3,568,814 | 3/1971 | Gates et al. | 198/598 |
| 3,666,093 | 5/1972 | Thornton et al. | 209/652 |
| 4,106,628 | 8/1978 | Warkentin et al. | 209/556 |
| 4,256,216 | 3/1981 | Winters et al. | 198/372 |
| 4,293,064 | 10/1981 | Robinson | 198/779 |
| 4,320,840 | 3/1982 | Braschos | 198/372 |
| 4,339,030 | 7/1982 | Hirata | 198/779 |
| 4,440,289 | 4/1984 | Weis | 198/448 |
| 4,474,295 | 10/1984 | Braschos | 198/372 |
| 4,505,380 | 3/1985 | McLemore et al. | 198/750 |

FOREIGN PATENT DOCUMENTS 429855 10/1974 U.S.S.R. ............................ 209/652

Primary Examiner—Joseph E. Valenza
Assistant Examiner—Daniel R. Alexander

[57] ABSTRACT

Diverter apparatus for rapidly and gently diverting articles, typically fruit, from a moving conveyor. The apparatus comprises an ejector lever member, an air cylinder assembly, and a stationary ejector lever mount, the two former sharing a common pivot point while each of the two is pivotable with respect to each other while pivoting on pivot pins mounted to the stationary mount. The working end of the ejector lever is caused to swing arcuately over a certain distance to divert the fruit when the piston rod of the air cylinder assembly travels a much shorter distance, thus permitting very rapid cycling of the diverter. Diverting and retraction strokes of the piston are controlled by air from a solenoid valve, the solenoid valve receiving control signals from a computer controlled relay.

9 Claims, 8 Drawing Figures

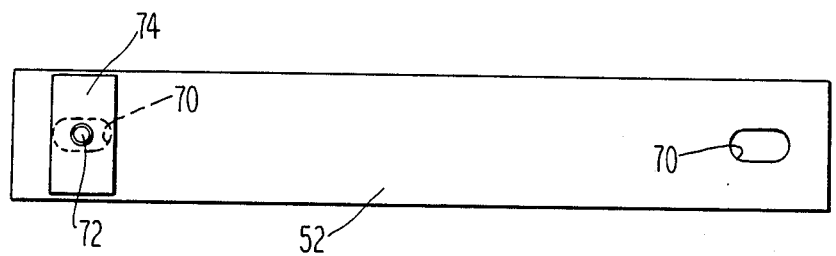
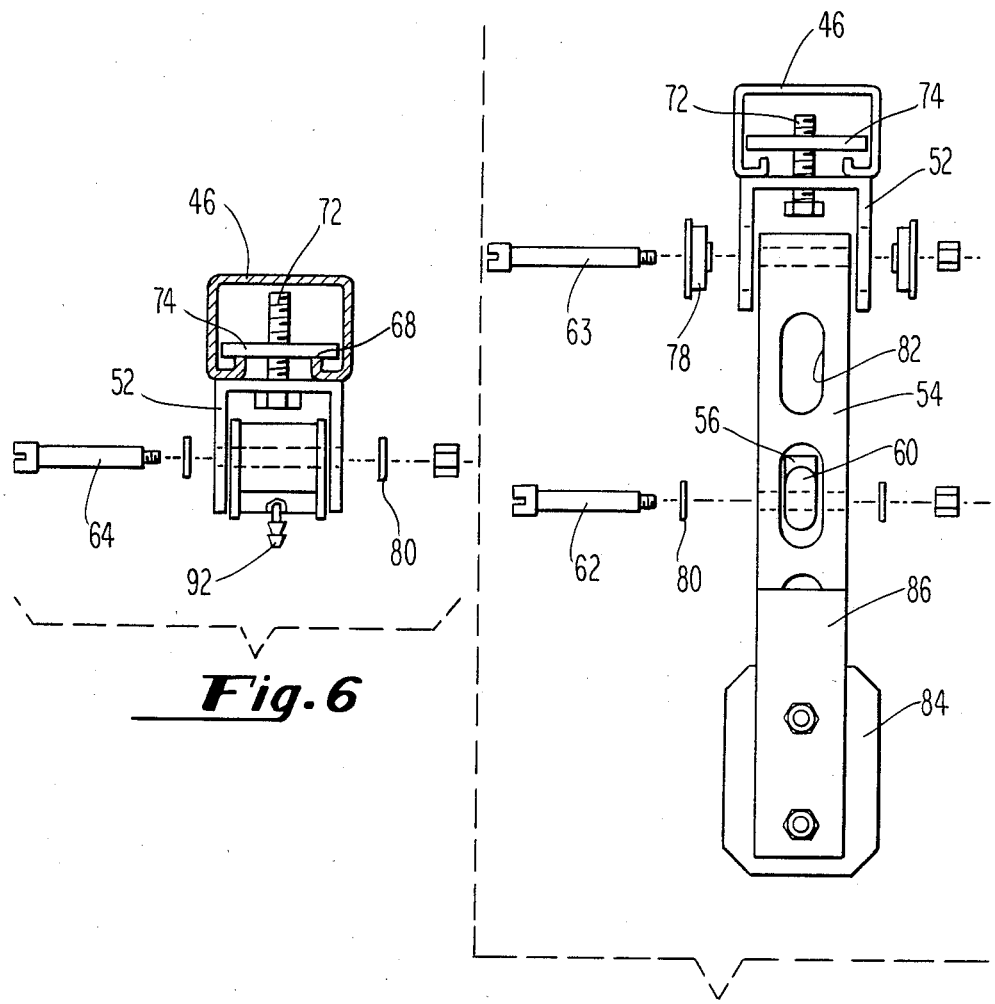

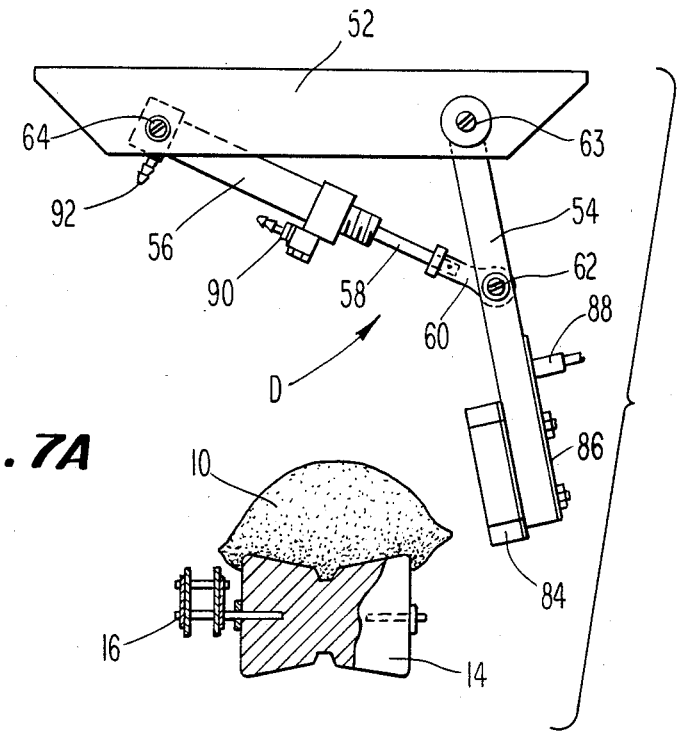
_Fig. 7A_
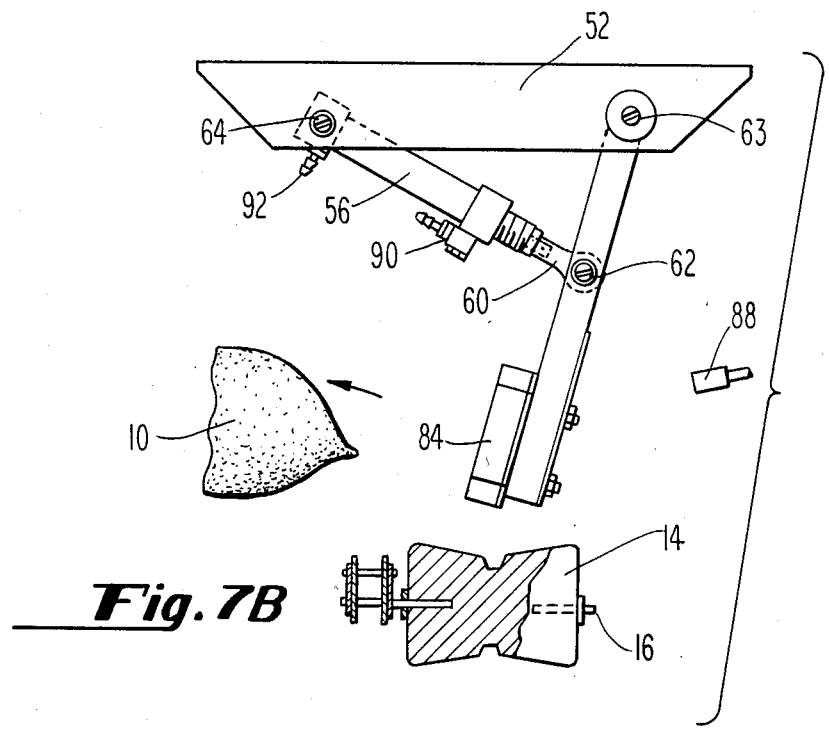
_Fig. 7B_

ARTICLE DIVERTER

CROSS-REFERENCE TO RELATED APPLICATIONS

Reference is made to copending application Ser. No. 430,083 of George A. Mills, for "Apparatus for Spinning Fruit For Sorting Thereof", filed Sept. 20, 1982, assigned to the assignee hereof.

SUMMARY OF THE INVENTION

The present invention relates to the rapid diversion of articles from a moving line and more particularly to the rapid and gentle selective removal of fruit transported on a moving conveyor.

BACKGROUND AND SUMMARY OF THIS INVENTION

In typical prior art automatic fruit sorting apparatus, optical sensors inspect each moving piece of fruit and generate a reject signal in response to the presence of a cull. The moving fruit to be sorted are carried on singulator conveyors, typically 3 or more, parallel disposed, each of which carry the fruit in single file from the loading chutes. Each singulator conveyor comprises rollers rotatably mounted to chain drive means. The rollers may be adjustably spaced along the chains in accordance with the size of fruit to cause each piece of fruit to be carried between adjacent rollers.

After the surfaces of the fruit are scanned by the optical sensors, and responsive signals generated in accordance with the scan, typically by means of a line scanning camera, ejection or diversion mechanism may be actuated in response to those signals to control mechanical diversion of the culls. Although the articles to be diverted by the present apparatus are hereinafter referred to as culls, it is understood, of course, that second-grade fruit or other computer selected fruit may also be included. The ejector mechanism may comprise a plurality of solenoid-controlled pistons, the solenoids being actuated by signals from output relays. Such prior art ejector mechanisms, however, suffer serious deficiencies. For example, with singulator conveyor speeds approaching 30" per second and rollers spaced about 3" apart (for lemons, for example), it is often necessary that the ejector be capable of consecutively diverting a series of lemon culls at a rate of about 10 per second without compounding their background injuries. Piston rods of existing diverters are caused to impact the fruit directly for deflection thereof from the pack line. For lemons, these piston rods normally travel in excess of 2". Prior art ejector mechanisms employing such long stroke piston rods are incapable of deflecting fruit at a sufficiently rapid rate. Even at these comparatively low diverting rates, the long piston rods would often bend, necessitating shut-down of the entire pack line. Efforts to shorten the stroke length of the piston rods to thereby increase the diversion rate of the ejectors were unsatisfactory, since some lemons invariably become positioned too close to or removed from the resilent bumper on the working end of the reciprotating piston rod to either bruise the lemons further or fail to deflect the lemons onto the cull conveyor belt.

The present apparatus is capable of rapidly, reliably, and gently diverting culls from pack lines. The apparatus employs a solenoid-controlled piston as did the prior art ejectors, but the piston stroke may be less than ½ shorter in length, thus providing exceptionally rapid cycling times with only the slightest chance of piston rod bending even after completion of 40,000,000 cycles.

Briefly, the present article diverter includes a first pivot point which defines the point at which an ejector lever pivots with respect to an ejector lever mount supporting the ejector lever, a solenoid-actuated air or hydraulic piston pivotally mounted to the ejector lever mount at a point distant from the first pivot point to comprise a second pivot point. The piston rod of the piston is affixed to a bearing member which is pivotally mounted to the ejector lever at a point intermediate the first pivot point and a resilient pad secured to the ejector lever at a point distant from said first pivot point to comprise a third pivot point. Thus, upon a short diverting stroke of the piston rod, the resilient pad is caused to swing in a relatively long arcuate path to impact offending fruit from the pack line. The retraction stroke of the piston rod returns the resilient pad and ejector lever to its original position along the same arcuate path. By adjusting the third pivot point slightly toward or away from the first pivot point, the arcuate length and speed of the diverting and retraction strokes can be readily controlled consonant with the size, density, injury proneness, and the like, of the fruit to be diverted.

BRIEF DESCRIPTION OF THE DRAWINGS

FIG. 4 is an exploded view of the article diverter of FIG. 3 looking in the direction of arrows 4—4.

FIG. 5 is a plan view of the article diverter of the present invention, one of the clamping members being omitted.

FIG. 6 is a partially sectioned exploded view of the article diverter of FIG. 3 looking in the direction of arrows 6—6.

FIGS. 7A and 7B are partially sectioned views respectively of the article diverter prior and subsequent to diverting an article such as a lemon, for example, from a singulator conveyor, parts omitted for purposes of clarity.

DETAILED DESCRIPTION OF THE INVENTION

A. Description of the Prior Art

Figure 1:
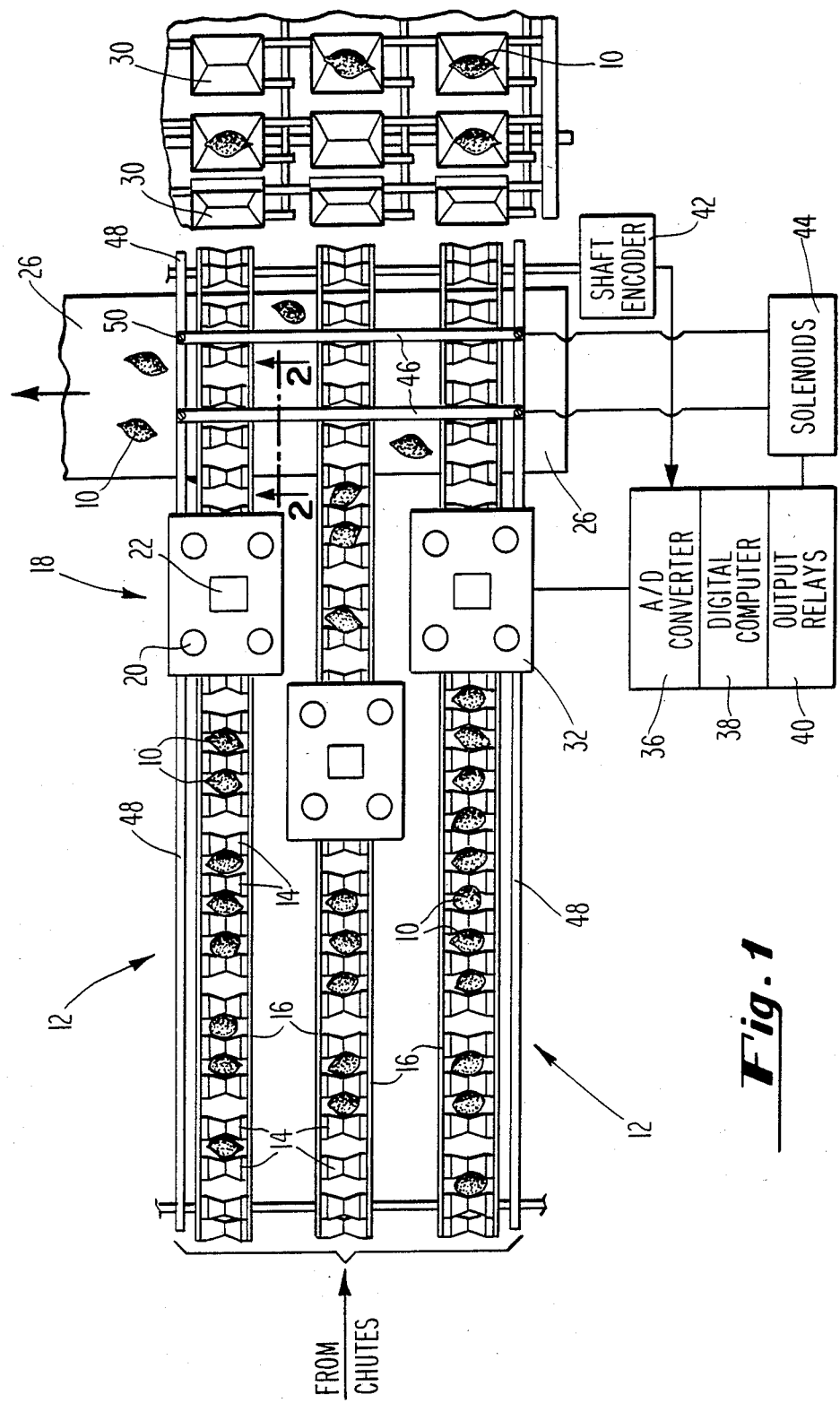
FIG. 1 is a schematic plan view of fruit sorting apparatus illustrating location of the article diverter of the present invention, including a block diagram of components used therewith.

In FIG. 1, articles to be sorted, or sorted and graded, typically fruit such as lemons 10, but not limited thereto, are received from chutes (not shown) and arranged in single file by an entrance portion of singulator conveyors 12, three such singulators being illustrated.

Singulator 12 comprises a plurality of spaced apart conveyor rollers 14 rotatably mounted on each side thereof to chains 16 which advance the fruit from left to right.

Other components of the apparatus include optical scanning units 18, each comprising a plurality of illuminators 20 for uniformly illuminating the surface areas of the fruit being tested or evaluated with visible, ultraviolet or infra-red radiation, depending upon the specific application. Three illuminators are employed in the illustration of FIG. 1. Illuminators 20 direct their radiation to the surfaces of the fruit at an angle of approximately 25° to thereby illuminate edges of the fruit substantially evenly. The illuminated fruit surfaces are detected by a line scanning camera 22 which generates video signals in response thereto for controlling ejector mechanism (not shown), which ejects the culls or unpackable fruit onto an endless conveyor belt 26 for discharge into cull bins and the like. The remaining fruit may continue along the pack line, to be color categorized, for example, by additional optical detection devices and then electronically weighed after fruit 10 has fallen into cups 30, and further processed, or the remaining fruit may be separated into several packable grades.

Each optical scanning unit 18 is enclosed in a suitable housing 32, which housings are preferably staggered to permit closer spacing of the singulators.

Line scanning camera 22 typically may comprise a suitable line scanning device such as a television camera or discrete detector array, for example, or the line scanning may be mechanically generated to provide signals proportional to the reflected light intensity.

The video signal generated by line scanning camera 22 are digitalized by an A/D converter 36. The digitalized signals are fed into a commercially available digital computer 38 capable of performing evaluation of the fruit in accordance with its general appearance or color, its maturity, or blemishes and discolorations thereon. Digital computer 38 is programmed to analyze reflectance obtained on each item of fruit and to generate responsive signals which are fed into output relays 40 for control of the ejector mechanism, or alternatively, the output relay signals may be fed into another computer for additional fruit control or processing. The ejector mechanism may comprise solenoid-controlled pistons, for example, the solenoids actuated by signals from output relays 40.

A shaft encoder 42 may be employed for generating clocking signals to synchronize the mechanical movement of the fruit with their electronic positioning. The encoder signals will be fed into A/D converter 36, digitalized by digital computer 38 for generation of signals by output relays 40, for fruit synchronization and positioning.

B. Detailed Description of the Present Apparatus

The present invention may be used with prior art apparatus abovedescribed or with the sorter apparatus disclosed in U.S Pat. No. 4,106,628, incorporated herein by reference, and assigned to the present assignee hereof.

Still referring to FIG. 1, relays 40 control actuation of conventional solenoids 44. Each diverter D of the present invention is controlled by a separate solenoid. Each solenoid causes air, for example, to energize a piston member of the present diverting mechanism to thereby cause an ejector lever to impact the cull fruit off the singulator conveyor 12. The piston immediately retracts by means of air forcing the piston to its original position in response to a signal fed from relays 40 to the solenoid.

Each singulator conveyor 12 is associated with an article or fruit diverter D, which diverters are adjustably mounted to cross support members or bars 46. Diverters D are preferably mounted in staggered relationship on bars 46, in a staggered manner similar to optical scanning units 18. Cross bars 46 are secured to chain guards 48 by bolts 50, or otherwise suitably secured thereto.

Referring now to FIGS. 2–6, diverters D include an ejector lever mount 52, ejector lever 54, and a trunnion cylinder 56 articulating with lever mount 52 and lever 54. Cylinder 56 is typically an air cylinder having a piston rod 58 extending therefrom, which rod is secured to a bearing member 60 pivotable around pivot pin 62 mounted intermediate the ends of ejector lever 54. Cylinder 56, of course, may be hydraulically actuated.

Ejector lever mount 52 (FIG. 4) may be three-sided in cross-section, permitting ejector lever 54 to pivot within mount 52 around pivot pin 63. Cylinder 56 is pivotally mounted to ejector lever mount 52 by means of pivot pin 64.

Ejector lever mount 52 is adjustably mounted to and supported by cross support bars 46, formed conveniently from a strip of metal wherein the longitudinal edges thereof are inwardly upturned to form a seating surface 68. A pair of slots 70 (FIG. 5) is disposed in ejector lever mount 52 in its upper horizontal portion adjacent ends thereof. Clamping screws 72 pass loosely through slots 70 to threadedly receive clamping bars 74. Turning of screws 72 causes clamping bars 74 to engage seating surface 68 to insure rigid and stable support of the diverter mechanism D. Since seating surface 68 extends the length of bars 46, the diverters are capable of adjustment longitudinally therewith by the simple expediency of sliding loosened clamping bars along the seating surfaces.

Conventional bearings 78 and washers 80 may be provided about the pivot pins, as shown. Optionally, ejector lever 54 may be provided with one or more cut-out portions 82 to reduce the weight of the lever. It must be appreciated that ejector lever 54, suitably aluminum or magnesium, may be rapidly cycling at the rate of 10 times per second.

A pad 84 of resilient material is secured to the lever 54 in order to eliminate or lessen bruising of the fruit upon impact.

Optionally, a metallic plate 86 is secured to ejector lever 54 at a lower portion thereof. Plate 86 impacts an hydraulic shock absorber 88, available as an off-the-shelf item, to reduce noise and vibration of the diverter mechanism when piston rod 58 would otherwise abruptly terminate its travel when retracting. Shock absorber 88 may be provided with an adjustable piston stroke.

Solenoid valves 44 used with present diverting mechanism are commercially available and typically are 2-position, 24 volts A.C., double solenoid operated, momentary contact (mechanically detented), 4 way air valves. Such solenoid valves are used primarily for the control of small bore, short stroke air cylinders, such as cylinder 56. The solenoids are actuated by a momentary electrical signal alternately on each of the two solenoids therein and include side ports with individual exhaust. A typical commercial solenoid valve suitable for use with the present diverting mechanism is the Series 11DSA441 solenoid manufactured by Numatics Inc., Highland, Mich., described in catalog Mark 7, 1973, revised 1981.

Other suitable off-the-self solenoid valves may be used advantageously with the present apparatus, e.g., a double coil solenoid wherein one of the coils, upon energization, permits air to pass through a port to actuate the diverting stroke and subsequent energization of the other coil permits air to pass through another port for the retraction stroke.

Air is supplied to the solenoids in a well known manner. Similarly, electrical connections to the solenoids are well known and not shown or described herein.

C. Operation

Figure 2:
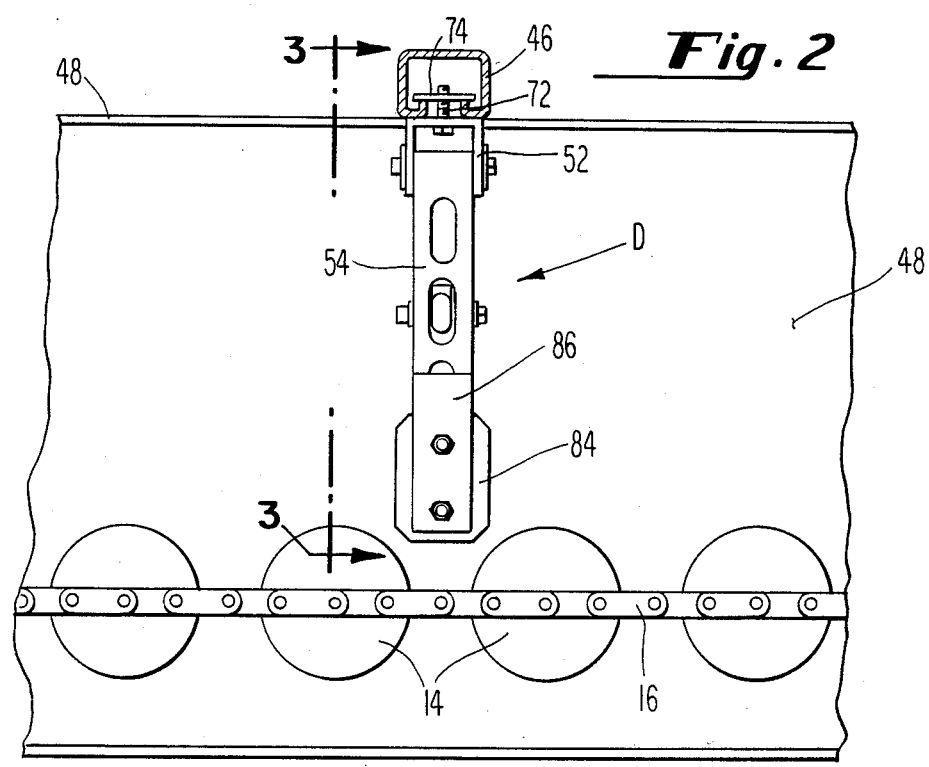
FIG. 2 in an elevational view of apparatus of FIG. 1 looking in the direction of arrows 2—2.
Figure 3:
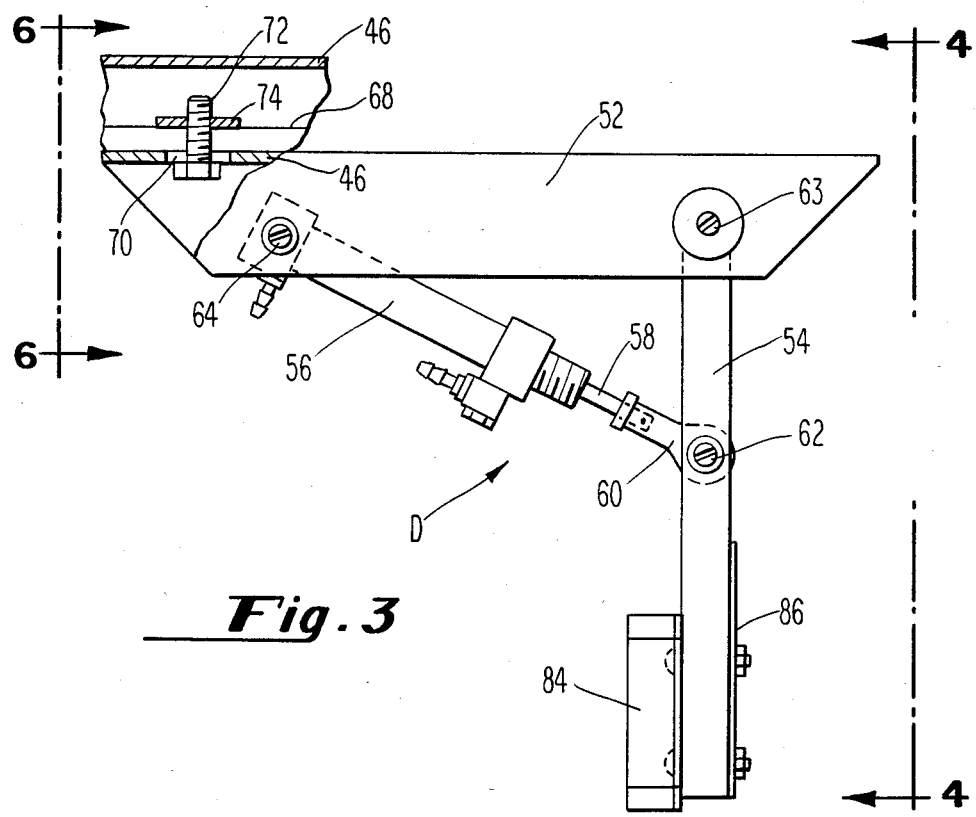
FIG. 3 illustrates a side elevation of the article diverter of FIG. 2 looking in the direction of arrows 3—3, including a portion shown in section.

In FIG. 7A, chain 16 carries conveyor rollers 14 therewith, and cull lemon 10, for example. At the instant the diverting mechanism D is substantially midway between rollers, as illustrated in FIG. 2, diverter D is actuated to remove lemon 10 from the pack line (FIG. 7B) and onto belt 26. In the fruit diverting stroke, air enters swivel barb 90 from solenoid valve 44; in the retraction stroke, air is directed into barb 92 from solenoid valve 44. Of course, both barbs communicate with the piston within cylinder 56.

If it is determined that the diverting stroke is not properly timed with the moving cull lemon, its position, as well as the position of subsequent fruit, may readily be optimized by "punching in" a desired millisecond delay or advance to computer 38.

Typical time delay between the start of the diverting stoke (FIG. 7A) and the start of the retraction stroke (FIG. 7B) is about 40-50 milliseconds, using an air pressure of about 40 psi and solenoids discussed above. The length of the piston rod stroke in the mechanism of FIGS. 7A and 7B is approximately 1".

Spacing of the cross support bars 46 is determined by the spacing between conveyor rollers 14 which is governed by the size of the fruit being transported. Thus, if there is a 3" spacing between rollers, the spacing of support bars 46 will be an integral of 3, i.e., 3", 6", 9", and the like.

Although only 3 singulator conveyors and one takeout or conveyor belt 26 are illustrated in FIG. 1 (and hence only 3 diverting mechanisms), it is understood that as many as 9 singulators, 2 take-out belts and 18 diverters may be controlled by a single master processor or computer 38.

For any single fruit diversion or removal, the present diverter is actuated (the total time consumed by both the diverting and retracting strokes) for a period less than about 50 milliseconds. Cycling speeds however, may readily be varied by control of the signals fed to the solenoids.

The diverter disclosed and hereinabove described is capable of removing fruit having a mass up to about one pound.

Diverting stroke strength, among other factors, may be affected by the choice of fluid in the cylinder, i.e., air or hydraulic fluid, as well as pressure thereof.

D. Summary

It is apparent from the foregoing description that we have provided an article and fruit diverting mechanism wherein the length of the piston stroke of the mechanism is shortened by approximately one-half over existing fruit ejectors due to novel and improved structure cooperating with the solenoid-controlled piston. The present diverter is capable of removing upwardly of about 10 fruit per second from the moving pack line, or almost double the rate of existing fruit ejectors. Shorter piston travel insures a higher degree of reliability of the present mechanism, e.g., continuous rapid cycling of the diverter over extended periods is not expected to produce any bending whatsoever of the piston rod. Further, in experimental testing of the present mechanism, examination of pre-examined and marked fruit impacted by the diverter while operating at diversion rates of about 10 lemons per second only very slightly compounded background injuries to cull lemons while injuring lemons taken directly from pre-grade lines and field bins to an insignificant extent.

It is understood, of course, that the present diverting apparatus may be used to remove articles other than fruit from moving lines. The apparatus may itself be caused to move or travel while diverting articles from stationary or moving lines.

We claim:

1. Article diverter for high speed diversion of articles from a moving line including
   conveying means for transporting said articles,
   support means mounted transversely over said moving line for supporting said article diverter over said conveying means in article diverting relationship thereto, said diverter comprising
   mounting means for slidably adjustably mounting said diverter to said support means along the length thereof transversely to said conveying means,
   a piston assembly having a first end pivotably mounted to one end of said mounting means forming a first pivot point,
   an ejector lever having one end pivotably mounted to other end of said mounting means forming a second pivot point, the distance between said first pivot point and said second pivot point on said mounting means being fixed, said ejector lever having a resilient pad secured thereto at the other end thereof for impacting said articles,
   said piston assembly having a second end pivotably mounted to said ejector lever at a point intermediate said resilient pad and said second pivot point forming a third pivot point,
   means for actuating the piston of said piston assembly for providing a diverting stroke and a retracting stroke,
   whereby said resilient pad traverses an arcuate path during said diverting and retracting strokes, each of said arcuate paths being substantially lengthier than the distance traveled by said piston during either of said diverting or retracting strokes.

2. Article diverter of claim 1 wherein said conveying means includes a plurality of spaced roller means, said piston assembly includes a piston rod secured to a pivoting bearing member at said third pivot point, said piston diverting and retracting strokes being actuated by air from solenoids.

3. Article diverter of claim 1 wherein said piston assembly includes a piston rod secured to a pivoting bearing member at said third pivot point, said piston diverting and retracting strokes being actuated by hydraulic fluid from solenoids.

4. Article diverter of claim 2 wherein said moving line includes a plurality of parallel disposed singulator conveyors, a chain guard mounted in spaced parallel relationship to the outer side of each of said conveyors, said support means mounted transversely to said chain guards, and wherein distance between said plurality of spaced roller means for each of said singulator conveyors governs distance between said support means, said article diverters rigidly adjustably depending from said support means in staggered relationship over said conveyors and being equal in number to the number of said conveyors.

5. Article diverter of claim 1 wherein said third pivot point is movable towards said second pivot point to increase the arcuate path length of said resilient pad during diverting and retracting strokes of said piston.

6. Article diverter of claim 1 wherein said third pivot point is movable toward said resilient pad to decrease the arcuate path length thereof during diverting and retracting strokes of said piston.

7. Article diverter of claim 1 wherein said ejector lever impacts noise suppressor means prior to completion of said retracting stroke.

8. Article diverter of claim 4 wherein each of said articles is transported between adjacent roller means of said singulator conveyors, said support means are mounted substantially transversely to said parallel disposed singulator conveyors, and said diverter mounting means are adjustable slidably longitudinally along said support means whereby the diverting stroke of said pistons causes said resilient pads to impact said moving articles.

9. Article diverter of claim 8 wherein said support means includes continuous seating means therealong, and said diverter mounting means includes clamping means removably attached thereto for adjustably engaging said seating means.

* * * * *